Sept. 10, 1963 R. D. PARRY 3,103,327
HELICOPTER CONTROL SYSTEM
Original Filed April 12, 1956 4 Sheets-Sheet 1

INVENTOR.
Robert D. Parry
BY
Wood, Herron & Evans.
ATTORNEYS.

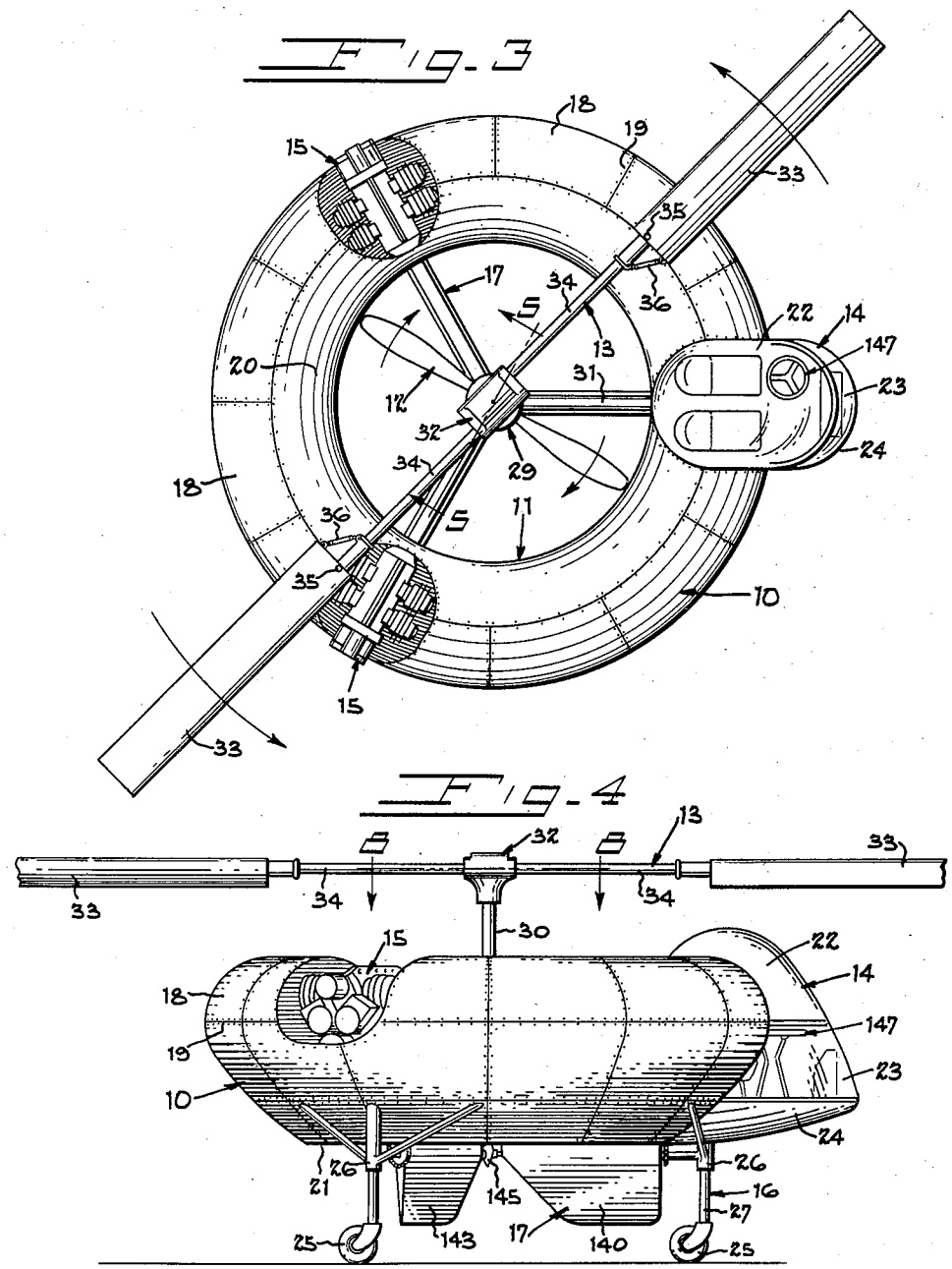

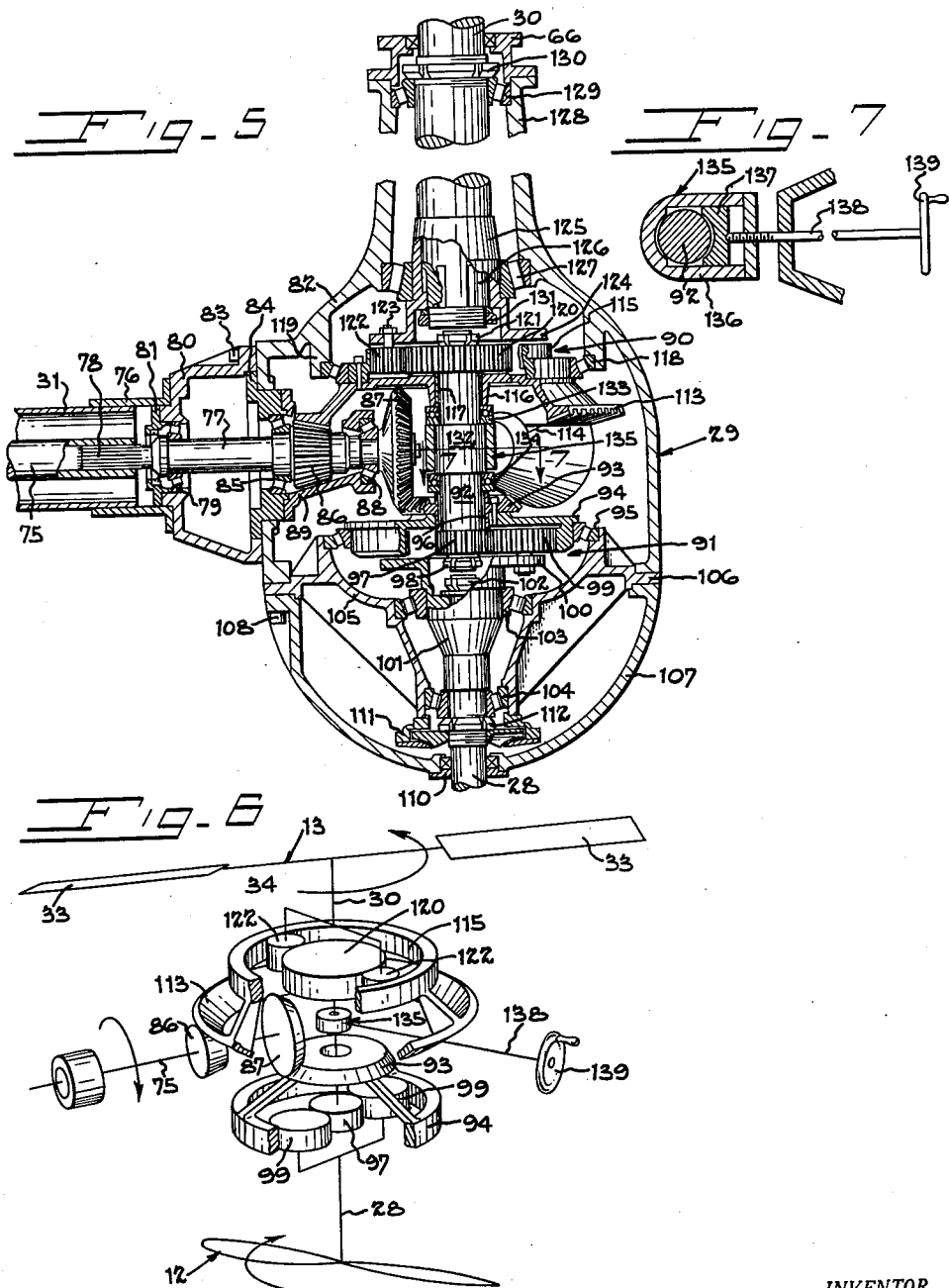

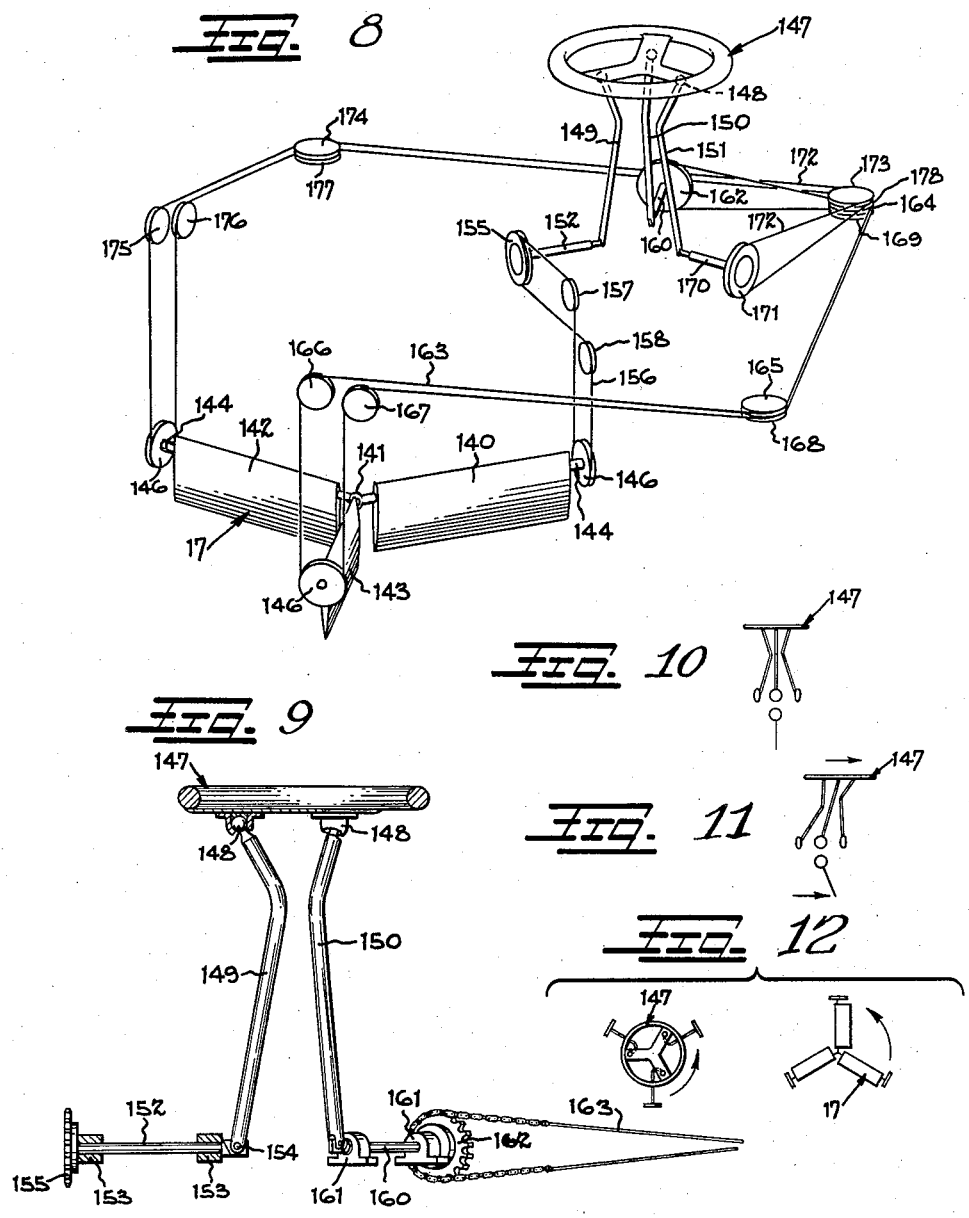

United States Patent Office 3,103,327
Patented Sept. 10, 1963

3,103,327
HELICOPTER CONTROL SYSTEM
Robert D. Parry, Cincinnati, Ohio, assignor of twenty percent to Charles B. Bolton, ten percent to Kenyon C. Bolton, and twenty percent to Justin C. Sholes, all of Cleveland, Ohio
Original application Apr. 12, 1956, Ser. No. 577,795, now Patent No. 2,996,269, dated Aug. 15, 1961. Divided and this application Mar. 21, 1961, Ser. No. 105,845
4 Claims. (Cl. 244—52)

This invention relates to helicopters and particularly to a system of controls for a helicopter. One such helicopter is disclosed in copending patent application Serial No. 577,795 filed April 12, 1956, now U.S. Patent No. 2,996,269, of which this application is a division. The helicopter of the copending application is one which employs a comparatively small, high speed propeller and a comparatively large low speed, vaned rotor to lift it and to sustain it in flight.

The fuselage of the helicopter is generally circular and it has a substantially large cylindrical throat which passes vertically through it. The propeller and the rotor are mounted for rotation about the central axis of the throat with the propeller being located within the throat and with the rotor being disposed above the fuselage. The pilot's compartment preferably is at the outer edge of the fuselage and he sits with his back to the throat so that his view is unobstructed. The engine or engines to drive the rotor and the propeller are located at the side of the fuselage opposite to the pilot's compartment so as to distribute as evenly as possible the weight with respect to the central axis of the aircraft.

One of the problems inherent in a helicopter or other aircraft employing a large rotor is the torque developed which tends to cause the aircraft to rotate or yaw in a direction counter to the direction in which the rotor is driven. In the helicopter of this invention this problem is overcome by driving the rotor and the propeller through a novel transmission which rotates the rotor in one direction and the propeller in the opposite direction while at all times maintaining the same torque force on the rotor and on the propeller regardless of the difference in their sizes and the difference in their relative speeds.

Both the rotor and the propeller create lift. However, whereas the rotor may rotate at 250 revolutions per minute, the propeller may rotate at 1700 revolutions per minute. The rotor creates lift in the way the rotor of a conventional helicopter creates lift. Being located above the fuselage, it is provided with vanes or airfoil sections which extend out beyond the sides of the circular fuselage. The propeller which may be a fixed pitch type, being located in the throat, propels a high speed stream or column of air down through the throat which is exhausted at the underside of the fuselage as a jet stream to create an upward thrust or lift. Directing vanes located within this high speed stream or column of air are provided which may be selectively angulated with respect to the direction of flow of the air for controlling the direction of flight of the helicopter and for changing its attitude in flight generally.

The primary objective of the invention, therefore, is to provide a control system for a helicopter of the type set forth which is exceedingly simple to operate. In the preferred embodiment, the control system for altering the angulation of the directing vanes which are located in the path of the high speed stream of air issuing from the throat comprises a wheel-like member. Moving this wheel-like member bodily to the left without rotating it causes the helicopter to tip or rock toward the left. Rotating it counter-clockwise toward the left causes the helicopter to turn, changing its flight direction toward the left. Pushing the wheel away from the pilot without rotating it causes the aircraft to descend, pulling it toward the pilot causes it to rise, and movements toward the right cause the aircraft to tip or to turn depending upon whether the wheel is moved with or without rotating it. Of course, combinations of these movements are used in making coordinated, banked turns. The simplified control system makes it possible for an inexperienced person to fly the helicopter with little preparatory instruction.

Other objectives of the invention will be readily apparent to those skilled in the art from the following detailed description of the drawings in which:

FIGURE 3 is a top plan view thereof.

FIGURE 4 is a side elevational view thereof.

FIGURE 5 is a fragmentary cross sectional view taken on the line 5—5 of FIGURE 3 illustrating the details of construction of the transmission through which the rotor and the propeller are driven.

FIGURE 6 is a diagrammatic perspective view, shown partly in section, to illustrate the various components of the transmission.

FIGURE 7 is a fragmentary cross sectional view taken on the line 7—7 of FIGURE 5.

FIGURE 8 is a schematic layout of the control system of the helicopter.

FIGURE 9 is a side view, shown partly in section, of the control wheel employed in the control system.

FIGURES 10–12 are diagrammatic views illustrating the operation of the control system.

Figure 1:
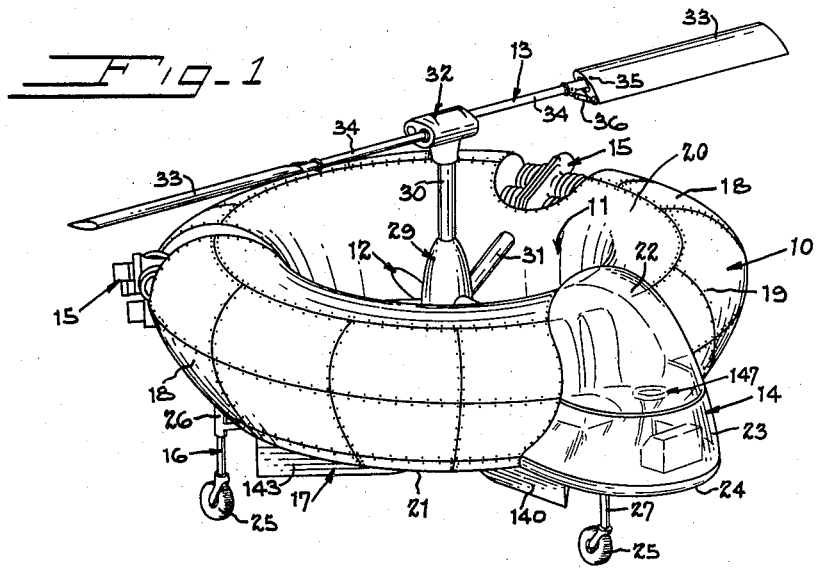
FIGURE 1 is a perspective view of a helicopter incorporating the principles of the present invention, the observer being above and at one side of the front of the helicopter.

The fuselage of the helicopter is designated generally by the numeral 10 in the drawings. As shown, the fuselage is generally circular and it is open at the center to define a throat 11 which extends vertically through it. Mounted within the throat, for rotation about the vertical central axis of the throat, is a propeller 12. Above the fuselage and on the same axis of rotation a rotor 13 is mounted. In the instance shown, a pilot's compartment or cockpit 14 is provided at one side of the fuselage, this side of the fuselage being the front of the helicopter. Two air cooled aircraft engines 15—15 are employed to drive the propeller and rotor. These engines are mounted in the fuselage at the side opposite the cockpit and in spaced relationship, such that the cockpit and the two engines are spaced from one another by 120 degrees. This is done so as to distribute the weight of the engine and the cockpit evenly around the vertical central axis of the aircraft. Obviously, if one engine is used it should be placed in the fuselage at a point diametrically opposite the cockpit. The engines preferably are exposed for cooling purposes. Landing gear designated generally 16 is provided at the underside of the fuselage. Three directing vanes, designated generally 17, used to control the direction and attitude of the aircraft in flight, are provided immediately adjacent the exit of the throat. These vanes also are disposed at 120 degrees with respect to one another and they are oriented so that one is aligned fore and aft, using the pilot's compartment as the front of the helicopter.

*Fuselage*

The fuselage 10 may be built up using known airframe construction techniques to the shape shown. In the present instance, the outer surface comprises a plurality of lightweight metal sheets 18 which are secured to the airframe members (not shown) by rivets 19. Preferably, the "skin" or lining for the inside of throat 11 is formed to provide a rounded flaring entrance 20 into the throat at the upper side of the fuselage. The exit to the throat preferably terminates at a sharp break 21 at the underside of the fuselage. It will be seen from the first four figures of the drawings that the fuselage is generally streamlined in the vertical direction. It will also be seen that the cockpit extends out from the side of the fuselage so as to provide good visibility for the pilot. In the instance shown, the upper part of the pilot's compartment is enclosed within a plastic bubble or canopy 22, and the lower part of the enclosure consists of a transparent wall 23. The canopy and part of the wall may be hinged to provide access into the pilot's compartment. Floor portion 24 of the cockpit may be built up of a framework which is covered at the underside by metal sheets similar to the plates 18 which enclose the outside of the fuselage. The details of construction of the cockpit, the fuselage and the engine mounts are not shown here, because it is within the knowledge of those skilled in the art of fabricating airframe structures to construct these elements.

The landing gear 16 comprises caster-mounted wheels 25 which are mounted in brackets 26. Preferably, shock absorbing struts 27 are employed between the wheels and the brackets. Three such wheels are used, these being spaced 120 degrees from one another with one of the wheels being located underneath the pilot's compartment. This places the other two wheels under the two engines. Here again, the construction of the landing gear is unimportant insofar as the invention is concerned, and it is believed to be within the knowledge of those skilled in the art to provide the details of construction and the manner in which brackets 26 may be joined to the structural frame members inside of the fuselage.

Propeller

A conventional aircraft propeller may be employed which is of a diameter slightly less than the diameter of the throat 11. In the instance shown in FIGURE 3, the propeller rotates in a counter-clockwise direction as viewed from above so as to drive or propel a column of air down through the throat. A fixed pitch propeller may be used. However, since it is desirable, in starting the engines for example, to feather the blades, known pitch changing devices may be employed. The propeller is driven by means of a shaft 28 which extends downwardly from the lower end of a transmission housing 29. Another shaft 30 extends from the upper end of the transmission housing, and it is in driving connection with the rotor 13. The transmission housing is located approximately in the center of the throat, and it is supported therein by means of three tubular members each of which is designated 31. These tubular members are in the same horizontal plane and they are spaced from one another at 120 degrees, with two of them joining the two engines to the transmission and with the third extending from the transmission to the rear of the cockpit. Generally, the drive shafts (not shown) of the two engines extend through the two tubes in the rear half of the throat, whereas control devices, to be described at a later point, extend through the tube joining the transmission to the cockpit. The outer ends of the tubes may be rigidly secured to the structural frame members of the fuselage following known techniques.

Rotor

The rotor consists of a hub 32, a pair of diametrically opposed vanes 33—33 and two tubular arms 34—34 which secure the vanes to the hub. The vanes 33—33 are fabricated following known techniques so that each one constitutes an airfoil section. It is preferred that the airfoil section be a symmetrical one; that is, one in which the chord line is located midway between the upper and lower surfaces of the section. However, it is anticipated that other airfoil sections may be used where conditions warrant. It will be seen in FIGURE 3 that the two vanes are to the outside of the throat area of the fuselage, and that they overhang the sides of the fuselage for a considerable extent of their overall lengths. A portion only at the inner end of each vanes is above the fuselage to drive cooling air down over the two engines which are exposed beneath them. In each instance, the outer end of the respective tubular arms 34—34 is configured to provide a clevis into which the inner end of the vane may be socketed. A clevis pin 35 secures the vane in place. It will be noted from FIGURE 3 of the drawings that the clevis pin joins the rotor arm to the vane at a point nearer to the leading edge of the vane than to the trailing edge thereof. To provide adjustment in the "lead" or "lag" of the two vanes relative to the tubular arms 34—34, an adjustable link 36 may be used to connect the inner end of the trailing edge of each vane to the tubular arm at a point spaced inwardly from the clevis pin 35.

For details of the construction of the rotor mechanism, and particularly that which is housed within hub 32, reference is made to copending application Serial No. 577,795.

Transmission

Where two engines are employed to drive the propeller and rotor, as in the case shown in the drawings, the two drive shafts only one of which is shown at 75, extends from the engines through the respective tubes 31 which are in the rear half of the throat and to the transmission housing 29. Preferably, the drive shafts 75 are hollow. The outer end of each tube has affixed to it a flanged sleeve 76 which may be secured directly to the transmission housing by means such as bolts (not shown). Each drive shaft is keyed to a short shaft 77 by means such as the splines shown at 78. Inasmuch as the connection to the transmission for each of the drive shafts is the same only one is shown and described here. The shaft 77 is journalled at its outer end in a thrust bearing 79 which is seated within the outer end of a journal box 80. A retainer ring 81, having an appropriate oil seal, is employed to secure thrust bearing 79 in place at the outer side of the journal box. The journal box is secured to the main casting, designated 82, of the transmission housing by means such as bolts, only one of which is shown at 83. The journal box is hollow at its interior and it has at its inner end a circular seat for a journal ring 84. The journal ring 84 seats a second thrust bearing 85, for the shaft 77, and the shaft has keyed to it a small bevel gear 86 just inwardly of the thrust bearing. The shaft 77 extends into the transmission passed the small bevel gear, and at its inner end it has keyed to it a second bevel gear 87 which is substantially larger than gear 86. Just to the outside of the larger bevel gear, the shaft is journalled in a third thrust bearing 88. The latter bearing is seated within the inner end of a journal cone designated 89. The outer end of the cone is seated against the inner face of the journal ring 84 and it may be secured to it by bolts or by other appropriate means. The two bevel gears 86 and 87, being keyed directly to shaft 77, rotate at the speed of the engine to which the hollow shaft 75 is connected.

The inside of the transmission mounts two planetary gear units, an upper one designated generally by the numeral 90 and a lower one designated by the numeral 91. The upper planetary gear unit is in driving connection with the shaft 30 for the rotor, whereas the lower planetary gear unit is in driving connection with the shaft 28 for the propeller. These two shafts are in axial alignment with one another on the vertical central axis of the throat within fuselage 10. In addition to their connections respectively to the rotor and propeller, the two planetary gear units are also connected to one another by means of a shaft 92 which is at the center of the transmission. In general, the gears within the transmission are arranged such that when the drive shaft from the engine is rotating at approximately 2600 revolutions per minute the shaft 30 to the rotor is rotating at 300 revolutions per minute, whereas the shaft 28 to the propeller is rotating at 2000 revolutions per minute. These speeds are set forth merely by way of example, it being appreciated that the speeds developed at shafts 28 and 30 are directly related to the sizes, inertia, and pitch of the rotor and of the propeller. In addition, as will be explained later, the speed of shaft 30 may vary considerably with respect to shaft 28, this being a very important function of the double planetary gear units which are employed in the transmission.

Describing the lower planetary gear unit 91 first, the larger bevel gear 87 which is at the inner end of shaft 77 is in driving connection with a bevel gear 93 which has approximately the same pitch diameter. The latter bevel gear 93 is secured directly to a substantially larger pitch diameter internal gear 94 which is journalled at its outer periphery in a circular thrust bearing 95 such that it is free to rotate. A bushing 96, which is seated within the common centers of gears 93 and 94, journals the lower end of the shaft 92 which connects the lower planetary gear unit to the upper planetary gear unit so that there may be relative rotative movement between the shaft 92 and the gears 93—94. Shaft 92 also has a pinion gear 97 keyed to its lower end within the same plane as the teeth of the internal gear 94. This gear is locked on to the lower end of shaft 92 by means of a nut 98. Within this same plane, at least two moon gears of the lower planetary unit, one of which is shown at 99, are disposed in mesh with the teeth of the internal gear 94 and the teeth of the pinion 97. As suggested, there may be two or more moon gears and they are mounted upon stub shafts, so that they can rotate freely, which are carried by a flange 100 which is at the upper end of a hollow drive cone 101. The shaft 28, which is in direct driving connection with the propeller, extends up through drive cone 101 and is keyed directly to it by splines or other known means. The upper end of drive shaft 28 is threaded and a nut 102 engaged on it. The drive cone is mounted for rotation in an upper thrust bearing 103 and a lower thrust bearing 104. These two thrust bearings are appropriately mounted within annular seats which are machined in a hollow casting 105. It will be noted that the casting 105 has at its upper end an annular seat in which the thrust bearing 95 for the internal gear 94 is journalled. The walls of the casting preferably are substantially thin to reduce weight and in order to strengthen it, it is preferred that the casting have a plurality of ribs on its outer side as shown in FIGURE 5. There is a peripheral flange 106 on the casting 105 which is secured to the main casting 82 of the transmission housing. In addition, there is a bell-shaped housing 107 which encloses the lower end of the planetary unit 91, this bell-shaped housing being bolted directly to the main casting 82 by means of bolts 103 which pass up through the peripheral flange 106 and into threaded bores within casting 82.

The shaft 28 extends through the lower end of the bell shaped casting with an appropriate oil seal 110 being provided. Immediately above the seal, an oil pump 111 is keyed to shaft 28 for feeding lubricating oil from the bottom of the transmission, formed by the bell shaped housing 107, up to the gears of the transmission. A specific oil system is not shown here inasmuch as it is believed to be within the expected skill or those in the art to provide such facilities. The lower end of the drive cone 101, which is seated within the thrust bearing 104, extends slightly below the thrust bearing and it is threaded to accommodate a lock nut 112. Tightening this nut serves to lock the drive cone in place against the inner races of the respective thrust bearings 103 and 104.

It will be seen, therefore, that the drive to the propeller comes from the engine through the bevel gears 87 and 93. This causes the large internal gear 94 to rotate, which in turn drives the moon gear around the pinion 97 to rotate the the drive cone which is keyed to shaft 28.

The upper planetary gear unit 90 has parts which complement the parts of the lower planetary gear unit, however, corresponding gears are of different sizes to reduce the speed from the engine drive shaft to the shaft 30. Bevel gear 86 which is on shaft 77, is in mesh with a bevel gear 113, this latter gear is the largest in the transmission and being driven from the comparatively small bevel gear 86, it constitutes one of the main factors in reducing the speed from the engine to the rotor shaft 30.

It will be noted that the upper part of the journal cone 89 is cut out as at 114 to permit the large bevel gear 113 to mesh with bevel gear 86. As in the case of the lower planetary gear unit, bevel gear 113 is secured directly to the underside of an internal gear 115. In this instance, however, the internal gear is seated in an annular groove which extends around the bevel gear 113. The internal gear and bevel gear are free to rotate with respect to connector shaft 92 inasmuch as a central journal sleeve 116 provided in the large bevel gear 113 which seats a bushing 117 through which the upper portion of the shaft 92 extends.

The outer periphery of internal gear 115 seats a thrust bearing 118, the outer race of which is engaged in a groove formed in an annular wall 119 which depends from the main casting 87 of the transmission housing. A pinion gear 120 is keyed directly to the upper end of shaft 92 in the plane of the teeth of internal gear 115 immediately above the bushing 117. A nut 121, threaded on the upper end of the shaft locks pinion gear 120 in place. It will be noted that the pinion 120 is considerably larger than pinion 97. The moon gears, one of which is designated 122, of the upper planetary unit are meshed with the teeth of internal gear 115 and with the pinion 121 and the moon gears are journalled upon means such as stub shafts, one of which is shown at 123, the stub shaft depending from an annular flange 124 of an upper drive cone 125. The latter cone is keyed directly to the lower end of the rotor shaft 30 by splines designated 126.

The drive cone 125 has a peripheral seat on it which receives the inner race of a thrust bearing 127. The outer race of this bearing is seated in a groove within casting 82. It will be noted that the upper part of the casting 82 is necked down and this necked down portion, indicated generally at 128 extends up to provide a seat for an upper thrust bearing 129 for the rotor shaft 30. The rotor shaft 30 and drive cone 125 are secured in place in the necked down portion of casting 82 by means of an upper nut 130 which is tightened down against the inner end of thrust bearing 129 and a nut 131 which is threaded on to the lower end of shaft 30 and tightened against an internal shoulder within the driving cone.

In summary, therefore, the engine drive to the rotor shaft 30 comes through the bevel gear 86, the large bevel gear 113, the internal gear 115 and the moon gears 122 which are carried by the drive cone 125.

The connector shaft 92 plays an exceedingly important role in the transmission. Since the drive to the lower planetary gear unit 91 is from the underside of the bevel gear 87, and since the bevel gear 113 is driven from the upper side of the bevel gear 86, the two planetary gear units are driven in opposite directions. This results in the counter rotation of the propeller with respect to the rotor. The primary function of the connector shaft 92 is to equalize the torque which is developed at the rotor and at the propeller under all operating conditions.

Attention is directed to FIGURE 6, assuming a condition of torque balance between the rotor and propeller and also assuming that the rotor is rotating in a counter-clockwise direction, as seen from above, the internal gear 115 also rotates in a counter-clockwise direction. The two moon gears 122 also rotate in the counter-clockwise direction and advance around the pinion 120 in the counter-clockwise direction. This assumes, of course, that the pinion gear 120 is not rotating, which would be the case under the condition set forth. Rotation of the moon gears 122 around pinion 120 tends to cause the pinion to rotate in a clockwise direction. Going now to the lower planetary gear unit, the internal gear 94 is rotating in clockwise direction as viewed from above, the moon gears 99 are also rotating and advancing around pinion gear 97 in the clockwise direction so that the tendency is to rotate pinion gear 97 in the counterclockwise direction which is just the opposite to the direction in which pinion gear 120 tends to rotate. These forces balance themselves through connector shaft 92, and thus prevent the shaft from rotating.

Assuming now a condition in which the rotor is turning slowly and the pilot wishes to accelerate, the rotor, being larger than the propeller, requires more force to accelerate than the lighter, smaller propeller. Hence, the inertia of the rotor slows down the orbital motion of the moon gears 122 about the pinion gear 120, and the latter gear, being connected to the lower planetary gear unit which drives the light propeller, now begins to rotate. This rotates the pinion 97 which speeds up the orbital motion of the moon gears 99 and thereby applying a torque to the lower propeller which balances the torque on shaft 30. It will be seen from this, that there are always equal and opposite torque forces at the two shafts 28 and 30 so as to prevent an unbalanced torque being applied against the aircraft as a whole to cause it to yaw. Referring again to FIGURE 5, provision is made to apply a braking force to the connector shaft 92. The center of the shaft has a collar 132 upon it. This collar is disposed between upper and lower ball bearings 133 and 134. The respective bearings rest against the shoulders provided by the collar and take up the endwise thrusts of the two lock nuts 98 and 121. Under normal circumstances, the shaft 92 is free to rotate within a braking device designated generally 135. FIGURE 7 shows, diagrammatically, a simplified version of a braking device which may be employed. The braking device comprises a yoke 136 which surrounds the collar in the central portion of shaft 92, a brake shoe 137, a threaded actuator shaft 138 for the brake shoe, and an actuator wheel 139 which is located in the cockpit of the aircraft. As may be seen, rotation of the wheel 139 in one direction causes the shoe 137 to be clamped against shaft 92, whereas rotation of the wheel in the opposite direction frees the brake shoe from the shaft. The brake is employed as an emergency expedient when there is a power failure. Under these conditions, the shaft 92 is locked by the pilot. The upper planetary unit then is driven by the windmilling of the rotor which drives the lower planetary gear unit and the propeller through the two bevel gears 86 and 87. This keeps the propeller rotating at a speed to maintain a flow of air over the control vanes 17 so that the pilot may alter the attitude of the ship during the free descent of the helicopter, permitting him to guide it into a safe landing place within an area beneath him, the size of the area being dependent upon his altitude and rate of forward speed at the time of the power failure.

*Control System*

Figure 2:
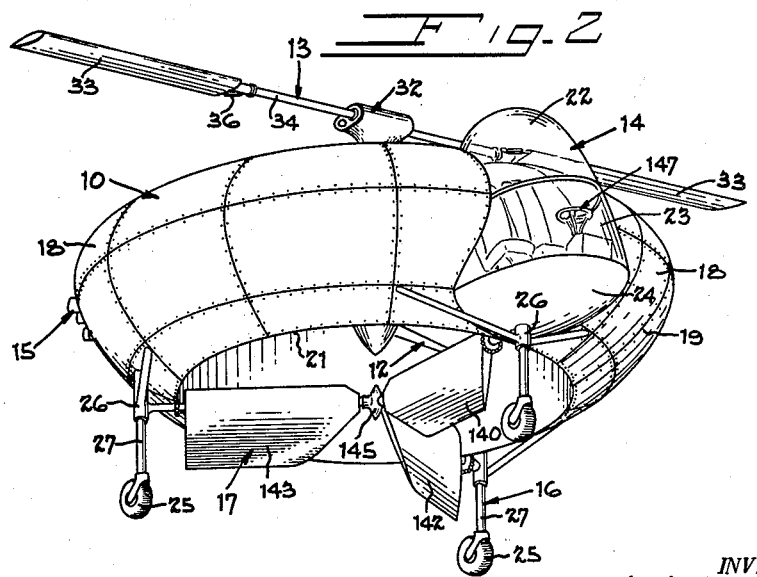
FIGURE 2 is a perspective view showing the underside of the helicopter.

The control vanes which have been designated generally by the numeral 17 are three in number and they are adapted to be angulated with respect to the vertical column of air driven by the propeller simultaneously and independently. One of the vanes indicated at 140 extends from a common central journal 141 for all three vanes toward the front of the helicopter. The other two vanes extend toward the rear and the respective opposite sides of the helicopter, the left vane being designated 142 and the right vane being designated 143. The vanes are arranged symmetrically around the vertical central axis of the aircraft, being spaced from one another by 120 degrees. The three vanes are of identical construction and each is mounted upon a control shaft 144, the three shafts meeting at the central journal 141. Each vane comprises a symmetrical airfoil section and the control rod extends through it longitudinally adjacent to the upper edge so that the vane is stable in the vertical position paralleling the flow of air driven down upon it by the propeller. As may be seen in FIGURES 2 and 4, the outer ends of the respective control shafts 144 may be journalled in appropriate bearings mounted within the brackets 26 for the landing gear. Journals for the inner ends of the three control shafts may be enclosed within a streamlined housing or hub 145. In addition, each one of the three control shafts has a sprocket wheel 146 keyed to it just to the outside of the control vane.

Going now to the diagrammatic views FIGURES 8 through 12, it will be seen that the three vanes may be selectively angulated by means of a control wheel designated generally 147 which is in the cockpit of the aircraft. Wheel 147 is mounted, by means of ball socket joints 148, upon top of three control levers, one of these control levers indicated at 149, is linked to control vane 140. A second of these control levers indicated at 150 is connected to the control vane 143, and the third control lever indicated at 151 is connected to the control vane 142. In other words, the fore and aft, left right relationships of the levers 149, 150 and 151 are diametrically opposed to these relationships in the three control vanes 140, 142 and 143, which they operate. The three control levers are angulated inwardly as shown in the diagrammatic views simply to provide knee room for the pilot since he sits directly behind the control wheel. When the helicopter is at rest on the ground, or when it is ascending or descending vertically, the control wheel is horizontal. The wheel and a throttle (not shown) for the engines are the only primary controls required.

The lower end of the control lever 149 is forked and it is connected to the inner end of a shaft 152 which is mounted in a pair of journal blocks 153—153 for rotation about an axis extending fore and aft of the helicopter. A clevis pin 154 which connects the lower end of the lever 149 to the shaft 152 extends transversely of the axis of shaft 152. The slot in the forked end of lever 149 permits it to pivot on the center of the clevis pin 154 without having any effect upon the shaft. It is only when the control lever 149 is swung from one side to the other that the shaft 152 is moved, the shaft turning in the two journal blocks 153—153. The rear end of shaft 152 has a sprocket 155 affixed to it, and this sprocket is connected by means of a continuous pitch chain 156 to the sprocket 146 which is as the forward end of the fore and aft vane 140. As may be seen in FIGURE 8, a pair of idler sprockets 157 and 158 are employed to guide the pitch chain 156, the upper run of the pitch chain leaving the sprocket 155 on shaft 152 passes over the top of idler sprocket 157 and then down and around the underside of sprocket 146, then up and over the top of the second idler sprocket 158 where it becomes the lower run toward and around sprocket 155. Thus, if wheel 147 is pushed to the left this causes sprocket 155 to rotate in a counter-clockwise direction, as viewed from the rear, which swings the bottom of the control vane 140 toward the left. The reaction of the column of air driven downwardly by the propeller on the angulated vane tends to tip the helicopter toward the left. Swinging the control lever 149 toward the right reverses this relationship, swinging the bottom of the control vane toward the right which causes the helicopter to tip toward the right. It is pointed out that movement of the wheel 139 fore and aft in alignment with the control vane 140 has no effect upon this vane since the slot at the lower end of lever 149 also is aligned fore and aft.

The lower end of the control lever 150 is also connected to a shaft which in this instance is indicated at 160. The latter shaft is aligned with the control vane 143 to which it is connected, and it is also connected to its actuator lever by means of a clevis pin similar to pin 154. In addition, journal blocks 161—161 are employed to mount the shaft so that it can only rotate about its longitudinal axis. Considering the wheel as a compass with the zero point being straight ahead and away from the pilot, the control shaft 160 extends from a point directly under the wheel toward the 300 degree mark on this imaginary compass which corresponds to the alignment of control vane 143 with respect to its journal, where in it extends at 120 degrees toward the right rear of the aircraft. The outer end of the shaft 160 has a sprocket 162 affixed to it which is connected to sprocket 146 on vane 143 by means of a pitch chain 163. The pitch chain extends toward the front of the cockpit and around an idler 164 and then toward the right of the fuselage and around an idler 165. From here the pitch chain extends toward the rear and its upper run is engaged around an idler 166. From here it extends down and around the underside of the sprocket 146 which is on vane 143. The pitch chain returns by passing up and over an idler 167, thence forwardly and around an idler 168 which is on an axis common to the idler 165. From this point, the pitch chain extends toward the front of the cockpit and around an idler 169 and thence around the underside of the sprocket 162. As the wheel is pulled toward the pilot, the aircraft is tipped toward the rear. This is a result of the sprocket 162 being rotated counter-clockwise as viewed from the inner end of the shaft 160. This tightens the upper run of the pitch chain 164 which causes the bottom of the control vane 143 to swing toward the rear. The reaction to this angulated position causes the helicopter to tip toward the rear and toward the left. However, the control vane 143 operates simultaneously with control vane 142 so that the tendency to tip toward the left is cancelled out by the simultaneous angulation of the latter vane as will be presently pointed out.

The pin connection at the lower end of the control lever 152 to a shaft 170 is identical to the connections of the other control levers previously described. In this case, the axis of shaft 170 is at 60 degrees from a point immediately below the control wheel 147, which corresponds to the 240 degree angular relationship of the longitudinal axis of the control shaft 144, upon which vane 142 is mounted. The outer end of shaft 170 has sprocket 171 affixed to it which is connected by means of a pitch chain 172 to sprocket 146 which is affixed to the outer end of the control shaft 144 upon which control vane 142 is mounted. The upper run of the pitch chain extends from the sprocket 171 around an idler 173 which is on the same vertical axis with the two idlers 164 and 169. From this point, the upper run of the pitch chain extends toward the left within the fuselage, around an idler 174 and an idler 175, and thence down and around the underside of sprocket 146. The return of the chain is around an idler 176 and an idler 177, the latter idler being on the same vertical axis with the idler 174. The lower run of the chain then extends toward the front of the cockpit, and then around an idler 178 which is directly beneath the idler 173 and on the same axis with the other two idlers previously described. From here the lower run of the pitch chain 172 extends around the sprocket 171.

Considering again that the pilot pulls the wheel straight back toward himself, sprocket 171 is rotated in the counter-clockwise direction as viewed from the inner end of shaft 170. This tightens the lower run of the pitch chain 172 and causes the lower end of control vane 142 to swing toward the rear and toward the right of the helicopter. In pulling the wheel straight back toward himself, the pilot is at the same time rotating the shaft 160 an equal amount with shaft 170 to swing the control vane 143 toward the rear and to the left as previously described. The angulation of the two vanes 142 and 143 with respect to one another cancels out the angular components except for those which tend to raise the nose of the helicopter.

Suppose now the pilot turns the wheel about its vertical axis without moving it in any direction from this axis. All three of the shafts 152, 160 and 170 would be rotated in equal amounts, and the lower edges of all three control vanes would be swung to present surfaces to a vertical column of air from the propeller which would cause the helicopter to rotate about its vertical axis toward the left, or counterclockwise as viewed from above. The same thing would happen, but in the opposite direction, if the pilot were to rotate the control wheel to the right. It is believed to be clear from this that the pilot may tip, turn and bank the aircraft in any direction he pleases by a combination of turning and swinging movements of the wheel. Furthermore, it will be noted that the movement which the pilot makes on the wheel is related directly to the attitude which the aircraft assumes. The movement of the wheel, therefore, is a natural one to the pilot and one that is easily mastered by a novice.

The attitude which the aircraft assumes in flight is also a function of the amount of lift developed by the rotor and by the propeller; and, since it is the reaction against the column of air which is driven down over the vanes by the propeller which is used to tip and turn the whole helicopter, the speed of this column of air is directly related to the changes which are made in the attitude of the aircraft by selectively angulating the vanes. Throttling devices for the engines are not shown here because these may be types which are generally known. It is recommended however that the throttles be located at the left side of the pilot and that they open or increase the speed of the engines upon being raised or swung upwardly, this movement being a natural one inasmuch as the speeding up of the engine causes the aircraft to ascend.

Preferably, the engines are started with the rotor vanes feathered. If a variable pitch propeller is employed, it too may be feathered. If desired, a slight negative angle of attack may be set into the two rotor vanes during starting so as to insure the helicopter remaining in place on the ground. With the engine brought up to speed and with both the rotor and propeller rotating, the pilot then may increase the angle of attack of two vanes simultaneously to develop upward lift so that the helicopter rises off of the ground. By adjusting either the degree of pitch or the throttle settings or both, the pilot can, of course, level off at a selected altitude. As explained previously, turning the wheel 147 either to the left or right causes the helicopter to turn without tilting around its vertical axis so that the pilot can if he wishes turn the aircraft in the direction in which he wishes to fly without banking. As this time the pilot may move the wheel 147 forward which tips the helicopter in that direction. This has the effect of angulating the rotor with respect to the horizontal and of angulating the high speed column of air which is exhausted from the bottom of the throat. Components of the thrust developed by the rotor and the propeller are resolved in the forward direction so that the helicopter starts ahead in the direction of tilt. By adjusting the throttle setting lift is retained while flying in the forward direction in order to maintain a fixed altitude. As explained previously, the aircraft may be controlled in flight by manipulation of the control vanes by wheel 147. The helicopter may be brought to a landing where desired by hovering the aircraft over a selected spot and then slowly throttling back the engines or by making a slight change in the pitch of the rotor to decrease the lift developed.

Having described my invention, I claim:

1. A control system for an aircraft having a circular throat with means in the throat for directing a high speed column of air downwardly therethrough, said control system comprising three control vanes which are journalled at a common point on the vertical central axis of the throat immediately below the exit of the throat, said vanes extending radially outwardly from said journal with one of the said vanes being oriented in the forward direction of flight of the aircraft and with the other two vanes being arranged symmetrically with respect to the first vane, three rotatably mounted control shafts oriented respectively radially outwardly from a central point, a forked control lever pinned to the inner end of each one of the control shafts on an axis which extends horizontally through the shaft at right angles to its longitudinal axis, each control lever extending upwardly from the end of the control shaft to which it is pinned, a control wheel, ball socket joints securing the upper ends of said control levers to said wheel, and flexible means interconnecting the respective control shaft to said vanes whereby movement of the wheel is transmitted to said vanes.

2. A control system for a helicopter having a cockpit therein, and said helicopter having a circular throat therein and means to drive a high speed column of air downwardly through said throat to create an upward lift, a plurality of vanes, said vanes being mounted for rotation about axes which extend radially outwardly from a common point which is on the vertical central axis of said throat, said vanes normally being streamlined with respect to the downward flow of the column of air, a sprocket at the outer end of each vane by which the vane may be angulated with respect to the downward flow of air, a sprocket in the cockpit of the helicopter corresponding to each sprocket on the vanes, the sprockets in the cockpit being oriented in the same pattern as the sprockets on the vanes but at the respective opposite sides of a central point, means to rotate the sprockets in the cockpit selectively, and pitch chains linking the sprockets in the cockpit to the corresponding sprockets on the vanes, whereby selective rotation of the sprockets at the cockpit results in selective angulation of the vanes in the downward flow of air, whereby the attitude of the helicopter may be varied in flight.

3. In an aircraft having a cockpit therein, said aircraft having a circular throat therein and means to drive a high speed column of air downwardly through said throat to create an upward lift, three vanes being mounted for rotation about axes which extend symmetrically, radially outwardly from a common point which is on the vertical central axis of said throat and below the exit thereof, said vanes normally being streamlined with respect to the downward flow of the column of air, a sprocket at the outer end of each vane by which the vane may be angulated with respect to the downward flow of air, a sprocket in the cockpit of the helicopter corresponding to each sprocket on the vanes, the sprockets in the cockpit being oriented around a central point like the sprockets on the vanes but at the respective opposite sides of said central point, means including a wheel to rotate the sprockets in the cockpit selectively, and pitch chains linking the sprockets in the cockpit to the corresponding sprockets on the vanes, whereby selective rotation of the sprockets at the cockpit results in selective angulation of the vanes in the downward flow of air, whereby the attitude of the helicopter may be varied in flight.

4. A control system for a helicopter having a circular fuselage and a circular throat extending vertically through the center of the fuselage, said system comprising a horizontally disposed control wheel, three control levers extending downwardly from said wheel, ball socket joints attaching said control levers to the underside of said wheel at points spaced symmetrically around its center, three control shafts extending symmetrically outwardly from a point below the center of said wheel, a control lever connected to each control shaft by a pin which transmits rotary motion only from the lever to the control shaft, a sprocket out of the control outer end of each control shaft for rotation therewith, means to drive a column of air downwardly through said throat, three vanes mounted below said throat and being arranged symmetrically around a point which is on the vertical central axis of the throat, said vanes normally being streamlined with respect to the column of air driven downwardly upon them, a sprocket at the outer end of each vane by which the vane may be angulated with respect to the column of air and a pitch chain connecting each of the sprockets on the vanes with a sprocket on a control shaft, whereby the vanes may be angulated by movements of the wheel to rotate the control shafts.

References Cited in the file of this patent

UNITED STATES PATENTS 2,874,920     Mallinckrodt _____ Feb. 24, 1959
2,953,320     Parry _____ Sept. 20, 1960